United States Patent
Graaf et al.

(10) Patent No.: US 9,897,356 B2
(45) Date of Patent: Feb. 20, 2018

(54) REFRIGERATION PLANT WITH REFRIGERANT EVAPORATOR ARRANGEMENT AND PROCESS FOR PARALLEL AIR AND BATTERY CONTACT COOLING

(75) Inventors: Marc Graaf, Krefeld (DE); Andreas Emmerich, Aachen (DE); Stephan Köster, Langerwehe (DE); Felix Girmscheid, Köln (DE); Peter Heyl, Köln (DE); Dominik Prinz, Elsdorf (DE)

(73) Assignee: HANON SYSTEMS, Daejeon-si (KR)

( * ) Notice: Subject to any disclaimer, the term of this patent is extended or adjusted under 35 U.S.C. 154(b) by 197 days.

(21) Appl. No.: 13/303,329

(22) Filed: Nov. 23, 2011

(65) Prior Publication Data

US 2012/0125032 A1      May 24, 2012

(30) Foreign Application Priority Data

Nov. 23, 2010 (DE) .................. 10 2010 061 805
Sep. 23, 2011 (DE) .................. 10 2011 053 894

(51) Int. Cl.
| | |
|---|---|
| *F25B 1/00* | (2006.01) |
| *F25B 43/00* | (2006.01) |
| *F25B 41/04* | (2006.01) |
| *B60H 1/00* | (2006.01) |
| *B60H 1/32* | (2006.01) |

(Continued)

(52) U.S. Cl.
CPC ........ *F25B 41/043* (2013.01); *B60H 1/00278* (2013.01); *B60H 1/323* (2013.01); *F25B 5/02* (2013.01); *H01M 10/613* (2015.04); *H01M 10/617* (2015.04); *H01M 10/625* (2015.04); *H01M 10/6551* (2015.04); *H01M 10/6569* (2015.04); *B60H 2001/00307* (2013.01)

(58) Field of Classification Search
CPC ....... F25B 41/043; F25B 5/02; H01M 10/613; H01M 10/6551; H01M 10/625; B60H 1/00278; B60H 1/323; B60H 2001/00307
USPC ...... 62/259.2, 117, 525, 504, 199, 200, 511, 62/217
See application file for complete search history.

(56) References Cited

U.S. PATENT DOCUMENTS 3,962,887 A * 6/1976 Bressendorff ................... 62/485
4,389,855 A * 6/1983 Ueda .................. B60H 1/00207
                                              62/200

(Continued)

FOREIGN PATENT DOCUMENTS

| DE | 102008035400 A1 | 2/2010 |
|---|---|---|
| EP | 0800940 A2 | 10/1997 |

(Continued)

*Primary Examiner* — Kun Kai Ma
(74) *Attorney, Agent, or Firm* — Shumaker, Loop & Kendrick, LLP; James D. Miller

(57) ABSTRACT

A refrigeration plant with refrigerant evaporator arrangement and process for parallel air and battery contact cooling. The refrigeration plant includes a refrigerant evaporator arrangement for parallel air and battery contact cooling, having with a refrigerant compressor and a condenser An evaporator with an assigned controllable expansion member for air cooling and an evaporator as a battery contact cooler with an assigned controllable expansion member for battery cooling are provided. A throttling member is located between the evaporator and the tap of the assigned controllable expansion member.

13 Claims, 6 Drawing Sheets

(51) Int. Cl.
*F25B 5/02* (2006.01)
*H01M 10/625* (2014.01)
*H01M 10/6551* (2014.01)
*H01M 10/613* (2014.01)
*H01M 10/6569* (2014.01)
*H01M 10/617* (2014.01)

(56) References Cited

U.S. PATENT DOCUMENTS

| | | | | |
|---|---|---|---|---|
| 4,537,041 A | * | 8/1985 | Denpou | F25B 5/00 |
| | | | | 62/199 |
| 4,565,072 A | * | 1/1986 | Fujiwara | B60H 1/323 |
| | | | | 62/196.2 |
| 5,182,920 A | * | 2/1993 | Matsuoka | F25B 41/043 |
| | | | | 62/206 |
| 5,524,455 A | * | 6/1996 | Hasegawa | F25B 39/022 |
| | | | | 62/513 |
| 5,709,097 A | * | 1/1998 | Kim | F24F 3/065 |
| | | | | 62/175 |
| 5,878,589 A | * | 3/1999 | Tanaka et al. | 62/199 |
| 6,092,379 A | * | 7/2000 | Nishida | B60H 1/3232 |
| | | | | 62/114 |
| 6,295,821 B1 | * | 10/2001 | Madigan | 62/117 |
| 6,327,867 B1 | * | 12/2001 | Hyodo | F25B 5/04 |
| | | | | 62/187 |
| 6,354,092 B1 | * | 3/2002 | Young et al. | 62/83 |
| 6,481,230 B2 | * | 11/2002 | Kimishima et al. | 62/239 |
| 6,499,307 B1 | * | 12/2002 | Peterson et al. | 62/196.1 |
| 7,658,083 B2 | * | 2/2010 | Zhu | B60H 1/00278 |
| | | | | 62/243 |
| 2002/0066278 A1 | * | 6/2002 | Cho et al. | 62/114 |
| 2003/0196445 A1 | * | 10/2003 | Cho | F25B 1/08 |
| | | | | 62/197 |
| 2004/0060310 A1 | * | 4/2004 | Liu | B60H 1/00792 |
| | | | | 62/228.3 |
| 2004/0261447 A1 | * | 12/2004 | Matsuoka et al. | 62/498 |
| 2006/0137388 A1 | * | 6/2006 | Kakehashi | B60H 1/323 |
| | | | | 62/513 |
| 2007/0074536 A1 | * | 4/2007 | Bai | F25B 9/006 |
| | | | | 62/513 |
| 2007/0251265 A1 | * | 11/2007 | Kurata | B60H 1/323 |
| | | | | 62/513 |
| 2008/0011014 A1 | * | 1/2008 | Renz | F25B 5/02 |
| | | | | 62/510 |
| 2009/0000315 A1 | * | 1/2009 | Billman | A23G 9/28 |
| | | | | 62/73 |
| 2009/0095003 A1 | * | 4/2009 | Nagano | F25B 39/02 |
| | | | | 62/217 |
| 2009/0249802 A1 | * | 10/2009 | Nemesh et al. | 62/56 |
| 2010/0064700 A1 | * | 3/2010 | Ziehr et al. | 62/84 |
| 2010/0147488 A1 | | 6/2010 | Pierre et al. | |
| 2010/0269527 A1 | * | 10/2010 | Thybo | F25B 5/02 |
| | | | | 62/200 |
| 2014/0326010 A1 | * | 11/2014 | Kawakami | B60H 1/323 |
| | | | | 62/222 |

FOREIGN PATENT DOCUMENTS

| | | | | |
|---|---|---|---|---|
| EP | 1460363 A2 | | 9/2004 | |
| GB | 1461545 A | * | 1/1977 | B60H 1/3205 |
| JP | H02282670 A | | 11/1990 | |
| JP | 2009222366 A | | 10/2009 | |
| JP | 2009281638 A | | 12/2009 | |
| WO | WO 8807654 A | * | 10/1988 | |

\* cited by examiner

REFRIGERATION PLANT WITH REFRIGERANT EVAPORATOR ARRANGEMENT AND PROCESS FOR PARALLEL AIR AND BATTERY CONTACT COOLING

CROSS-REFERENCE TO RELATED APPLICATION

This application claims the benefit of priority of German Patent Application Serial Nos. DE 10 2010 061 805.5 filed on Nov. 23, 2010, and DE 10 2011 053 894.1 filed on Sep. 23, 2011, the entire disclosures of which are hereby incorporated herein by reference.

FIELD OF INVENTION

The invention relates to a refrigeration plant with a refrigerant evaporator arrangement suitable for parallel air cooling and battery contact cooling, and a process for operating the refrigeration plant. A preferred field of application of the invention is in the field of motor vehicle cooling and HVAC in combination with the problem of cooling the batteries or accumulators of motor vehicles.

BACKGROUND OF THE INVENTION

Within the scope of the development of electric or hybrid vehicles, there is a trend towards, and the necessity to, operate high-power batteries in motor vehicles. For optimal utilization, the batteries require cooling to reach a defined operating temperature.

It is well known that batteries, and more specifically, high-performance batteries, have an optimum operating temperature and require as homogeneous a temperature distribution as possible over all cells. Therefore, the technical solutions of prior art aim at directly cooling the motor vehicle batteries by using a refrigerant evaporator by refrigerant direct cooling or contact cooling, respectively. The refrigerant evaporator is integrated into the motor vehicle's refrigeration plant for the air conditioning of the passenger compartment.

DE 10 2009 029 629 A1 discloses a heat exchanger for the tempering of vehicle batteries. The heat exchanger at the same time is established as a holder of the battery units in motor vehicles. In this instance, the surface temperature of the cooling surface is maintained at a level as homogeneous as possible by a defined guiding of the refrigerant through the channels of the multipart tubes.

Further, DE 10 2008 035 400 A1 discloses a device for cooling a heat source of a motor vehicle. A cooling body has several forward flows and several return flows, and a homogenization of the surface temperature of the cooling sheets is obtained by guiding the adjacent flows in forward and backward directions.

Evaporators for the cooling of batteries, also referred to as battery coolers or contact coolers, are integrated into the refrigeration circuit, according to prior art, parallel to the passenger compartment evaporator, or air cooler. Thus, the pressure level at the exit of the battery cooler is equal to the pressure level at the exit of the passenger compartment evaporator. Therefore, the temperature level of the battery cooler is equal to the temperature level of the passenger compartment evaporator. The refrigerant mass flow in the battery cooler, just like in the passenger compartment evaporator, is controlled by a thermostatic expansion valve. The thermostatic expansion valve controls the mass flow in such a way that a defined overheating at the exit of the air cooler and the battery cooler is adjusted.

The prior art has several disadvantages. First, dividing the refrigerant mass flow supplied to the evaporators even for a symmetrical design leads to a slight unevenness in the mass distribution due to minor differences in the flow resistances of the individual flow paths. The refrigerant in the flow path with a lower mass flow proportion will be overheated a little more than the refrigerant in the other flow path. However, due to overheating, the flow resistance in this flow path will increase. This effect is compounded by the control of a defined overheating at the exit of the evaporator after mixing of the partial mass flows.

Second, normally at the exit of the evaporators there is a diphase mixture with a low vapor proportion, but the vapor proportion is not evenly distributed over the flow cross-section. If a division into several flow paths is made, slight differences in the vapor proportion of the single partial mass flows will result. The flow path with the lower vapor proportion will be overheated a little more than the other flow path. As mentioned above, this effect will be compounded by the higher flow resistance of this partial mass flow.

Another disadvantageous effect if the battery and vehicle coolers are operated in parallel is that a clearly higher refrigeration power is required when the drive batteries are dynamically cooled compared to the stationary cooling load due to the electric losses. The dynamic refrigeration power can be higher than double the stationary cooling load. The high refrigeration power in case of dynamic battery cooling causes an undesired high temperature spread in the battery cells due to the relatively bad heat conduction in the cells. The high temperature spread has a negative effect on the life of the battery cells.

Further, the overheating at the exit of the battery cooler causes the refrigerant temperature to increase, hence, an uneven temperature distribution at the surface of the battery cooler. This unevenness in the temperature distribution, due to bad heat conduction in the battery cells, reappears in the cells.

It would be desirable to provide a refrigeration plant and process that realizes an improvement of the temperature distribution in the battery cells.

SUMMARY OF THE INVENTION

Consonant with the present invention, a refrigeration plant and process that realizes an improvement of the temperature distribution in the battery cells, has surprisingly been discovered.

The problem is solved by a refrigeration plant with a refrigerant evaporator arrangement for parallel air and battery contact cooling that includes a refrigerant compressor and a condenser. Further included is an evaporator for air cooling with an assigned controllable expansion member and an evaporator as a battery contact cooler with an assigned controllable expansion member for battery cooling. According to the invention, a throttling member is located between the evaporator for battery cooling and the tap of the assigned controllable expansion member.

According to the concept, the throttling of the refrigerant downstream of the battery cooler causes the liquid refrigerant to be impounded in the battery cooler. This results in a more homogeneous distribution of the refrigerant which, in effect, will have a positive impact.

Surprisingly and particularly advantageously, it has been shown that an improvement of the temperature distribution due to the reduced dynamic cooling power for the battery cooler is accompanied by a simultaneous homogenization of the surface temperature of the battery contact cooler.

An almost completely evaporated diphase mixture, especially using the refrigerants R134a or R1234yf, for example, will be completely evaporated or overheated by a specific throttling at the exit of the battery cooler. The thermostatic expansion valve positioned after throttling controls the mass flow such that the required overheating occurs after the throttling. In the area of the actual evaporator, however, no overheating occurs. The surface of the evaporator keeps a very homogeneous temperature distribution due to the low pressure loss and lack of overheating, which is particularly advantageous. Due to the specific throttling of the refrigerant mass flow leaving the evaporator of the battery contact cooling before the entry, or the tapping by the thermostatic expansion valve the evaporation in the battery cooler occurs at a higher temperature level than the evaporation in the passenger compartment evaporator of the HVAC system.

The driving temperature potential between the surfaces to be cooled and the cooling medium refrigerant is reduced, which reduces the increased dynamic load. In this way overheating is avoided, or minimized, and the temperature at the surface of the battery cooler remains very homogeneous.

In addition, the throttling limits the refrigerant mass flow through the battery cooler during the dynamic cooling.

In an embodiment of the invention, the throttling member for throttling the refrigerant mass flow after the evaporator for battery cooling is configured as a fixed throttle.

Another advantageous and additional measure is to provide means for the homogenization of the refrigerant liquid and the refrigerant vapor. The refrigerant vapor portion of the refrigerant mass flow provided for battery cooling is evenly distributed over the partial mass flows of the refrigerant.

Specific internal attachments such as a helical insert, a sieve or a sprinkler homogenize the flow at the entry of the evaporator, creating a homogeneous division in the flow paths with equal vapor proportions.

Another advantageous design measure that increases the efficiency of the refrigeration plant is to provide a liquid separator upstream of the evaporator for battery cooling.

The use of a liquid separator, such as a centrifugal separator, at the entry of the evaporator divides the flow at the entry of the evaporator into a purely liquid and a purely vaporous flow. The refrigerant liquid is supplied to the evaporator and divided into the appropriate flow paths of the evaporator. The refrigerant vapor is, after specific throttling, guided in bypass and reentered into the overheated refrigerant at the exit of the battery cooler, but before the tap of the thermostatic expansion valve.

In other advantageous designs of the invention, the evaporator for battery cooling includes several single evaporators switched in parallel.

The process for the simultaneous air and battery contact cooling using a refrigeration plant as mentioned above is designed such that:
the refrigerant mass flow after the condenser of the refrigeration plant is divided;
a refrigerant partial mass flow is throttled using an expansion member before the evaporator of the refrigeration plant for air cooling down to a low evaporation pressure $p_{LK}$ for the air cooling, and parallel thereto;
a refrigerant partial mass flow is throttled using an expansion member before the evaporator for battery contact cooling to a higher evaporation pressure $p_{BK}$ for the air cooling, thereby impounding the refrigerant liquid in the evaporator; and
the refrigerant partial mass flow for battery contact cooling after the evaporator is also throttled to the lower evaporation pressure $p_{LK}$ using the throttling member.

It has shown to be advantageous to design the throttling member for throttling the refrigerant partial mass flow for battery cooling such that the battery cooler inclusive of the throttle has a pressure loss of 1.0 to 2.0 bar, with the throttle proportion of the pressure loss preferably at least 0.5 bar.

The process is advantageously further developed because refrigerant vapor and refrigerant liquid are homogenized to make the vapor proportion more before the refrigerant mass flow is divided into flow paths of the battery contact cooler.

In an alternative embodiment, refrigerant vapor and refrigerant liquid are separated before the evaporator for battery contact cooling and the refrigerant liquid is evaporated in the evaporator. The refrigerant vapor is throttled and reentered into the overheated vapor at the exit of the evaporator.

Finally, in another alternative embodiment, refrigerant vapor and refrigerant liquid are separated by use of a liquid separator, such as a centrifugal separator, before the evaporator for battery cooling and then mixed before the entry into the evaporator in order to ensure an equally distributed vapor proportion in the individual flow paths.

Thus, the refrigeration plant and the proposed process have an especially advantageous even temperature distribution at the surface of the evaporator of the battery cooling. This results in a lower load and slower aging of the battery cells, and, as a result, an advantageous increase of the life of the battery cells, especially the life of Li ion battery cells.

Also, the refrigerant mass flow required for the battery cooler is reduced, which results in a lower energetic effort for cooling the batteries. This results in a longer range of the electrically driven vehicle with the same battery capacity.

The proposed measures enable the technically important problem of the development of overheat zones in battery contact coolers with overheat controlled refrigerant evaporators to be solved by reducing these overheat zones.

Further advantages particularly of the invention are the reduction of the overheat zone of an overheat controlled evaporator, the even refrigerant division onto parallel switched evaporators and the flow paths within the evaporator, and the generation of different evaporation temperatures in multi evaporator plants.

BRIEF DESCRIPTION OF THE DRAWINGS

The above, as well as other advantages of the present invention, will become readily apparent to those skilled in the art from the following detailed description when considered in the light of the accompanying drawings, in which.

DETAILED DESCRIPTION OF EXEMPLARY EMBODIMENTS OF THE INVENTION

The following detailed description and appended drawings describe and illustrate an exemplary embodiment of the invention. The description and drawings serve to enable one skilled in the art to make and use the invention, and are not intended to limit the scope of the invention in any manner.

Figure 1:
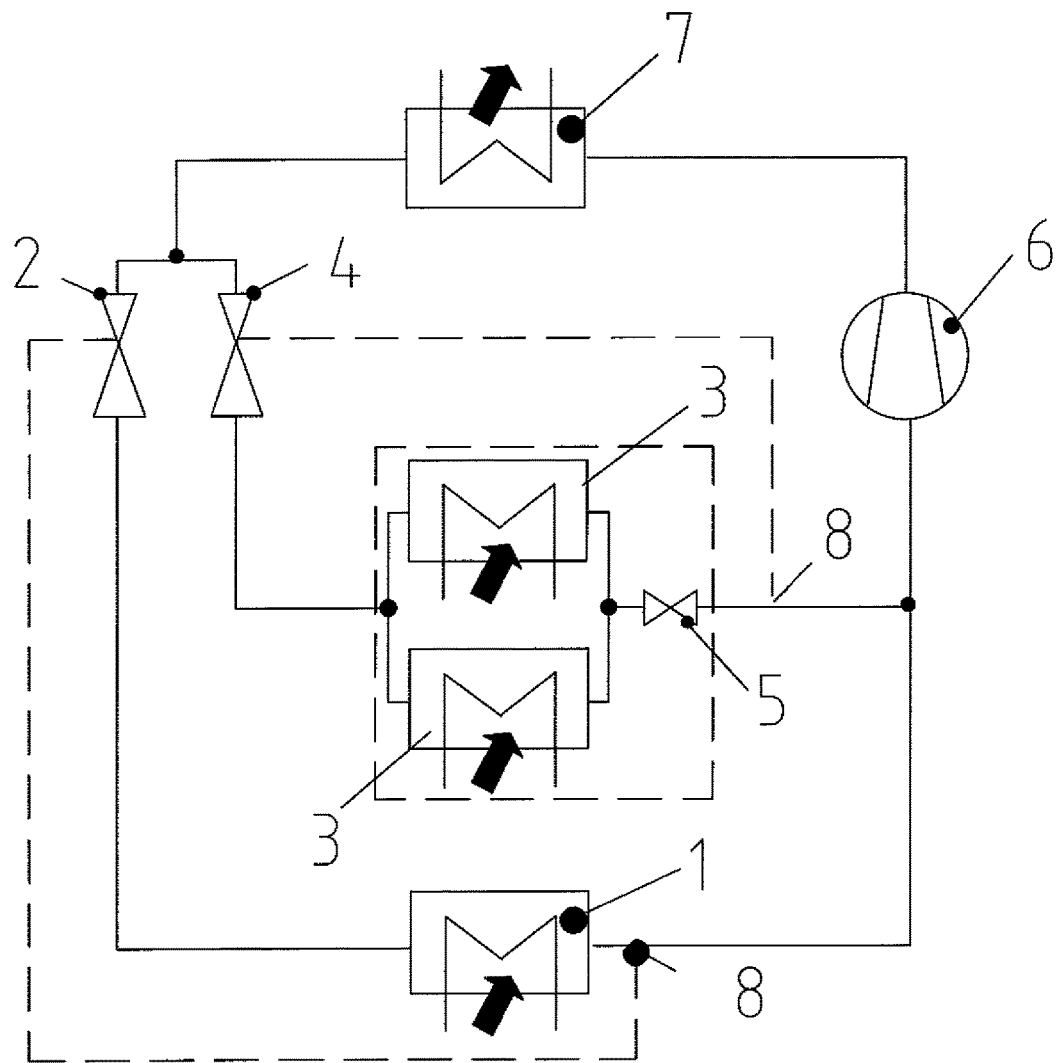
FIG. 1 represents a schematic circuit diagram of a refrigeration plant according to an embodiment of the invention.

FIG. 1 shows a schematic circuit diagram of a refrigeration plant according to one embodiment of the invention with the relevant technical components. The main element of every refrigeration plant is the compressor 6 that compresses the gaseous refrigerant to the condensation pressure, and delivers it to the condenser 7. In the condenser 7, the refrigerant condenses to the condensation pressure level releasing heat, which is schematically indicated by an arrow in FIG. 1. The condensed, liquefied refrigerant reaches a branching point where the refrigerant mass flow is divided into a refrigerant partial mass flow for the cooling of the passenger compartment and a refrigerant partial mass flow for the cooling of the battery.

The evaporator 1 of the HVAC system, also referred to as the air cooler or passenger compartment evaporator, is connected to the assigned thermostatic expansion valve 2 and receives the refrigerant partial mass flow that is throttled in the expansion member 2 provided for cooling the air. Air is cooled for the air conditioning of the passenger compartment and the refrigerant evaporates. The slightly overheated refrigerant leaves the evaporator 1 and flows to the tap 8 of the expansion member 2, where the control circuit of the controlled thermostatic expansion valve 2 is closed.

The second refrigerant partial mass flow reaches over the expansion member 4, which is also established as the thermostatic expansion valve. The battery cooler 3 is configured as two single evaporators switched in parallel. The refrigerant partial mass flow is divided onto the two evaporators 3, and the battery in direct contact with the battery contact cooler 3 is cooled. The refrigerant partial mass flows from the evaporators 3 are assembled and decompressed in the throttling member 5, which is established as fixed throttle, to the evaporation pressure $p_{LK}$ of the air cooler 1. Subsequently, the tap 8 of the expansion member 4 controls the thermostatic expansion valve 4 and eventually, the slightly overheated refrigerant partial mass flows of the battery cooling and the air cooling are united and supplied to the compressor 6, closing the circuit.

Figure 2:
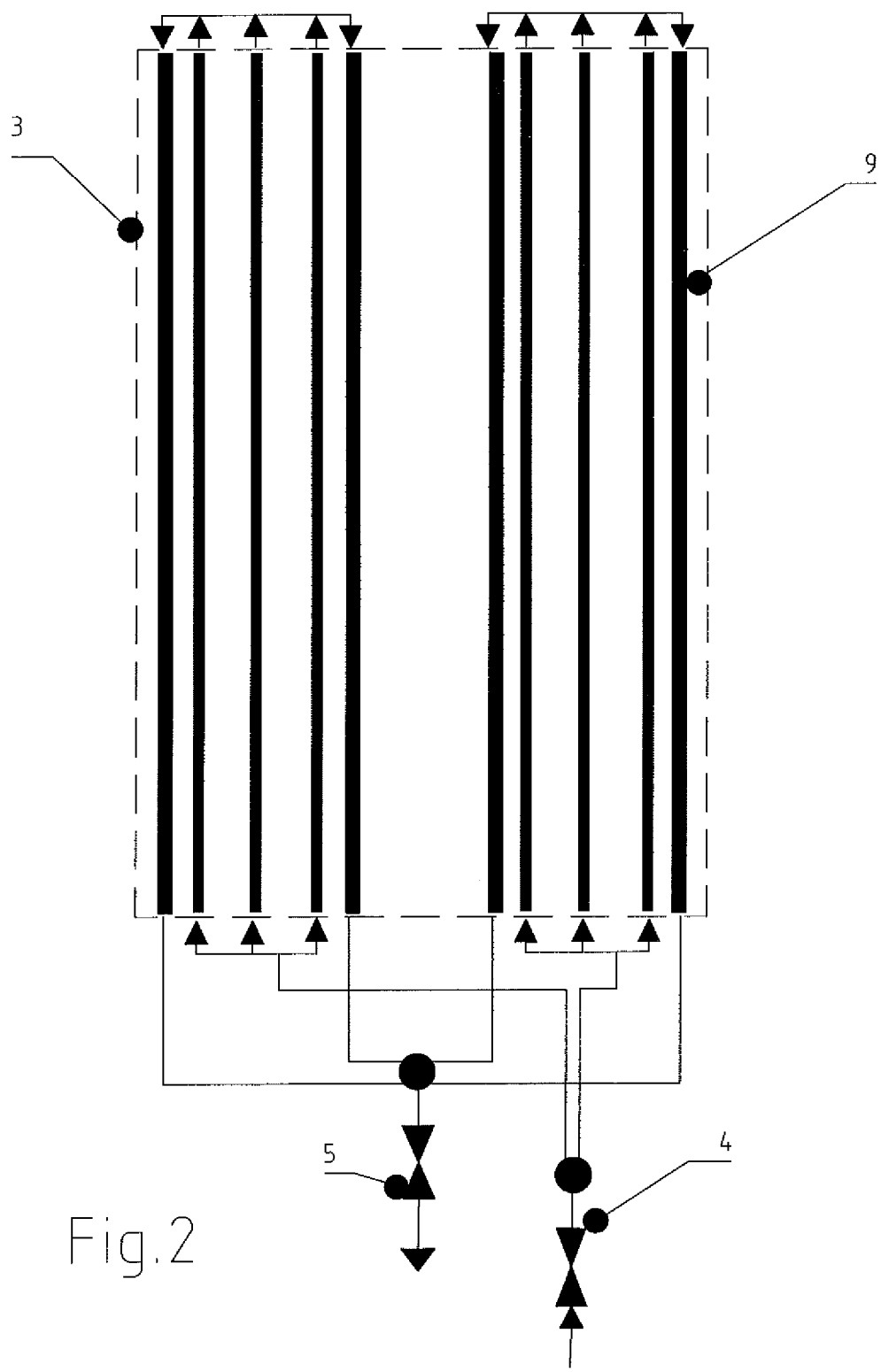
FIG. 2 represents a schematic representation of a battery cooler according to an embodiment of the invention.

FIG. 2 shows the battery contact cooler 3 in a schematic representation. The liquid refrigerant flows over the expansion member 4, where it is decompressed to the evaporation pressure $p_{BK}$ of the battery cooler 3, into the refrigerant evaporator arrangement 3 and is divided onto various flow paths. Once past the evaporator 3, the refrigerant flow is turned and assembled from the various paths into the fixed throttle 5, where the pressure is reduced to the evaporation pressure $p_{LK}$ of the air cooler.

Figure 3:
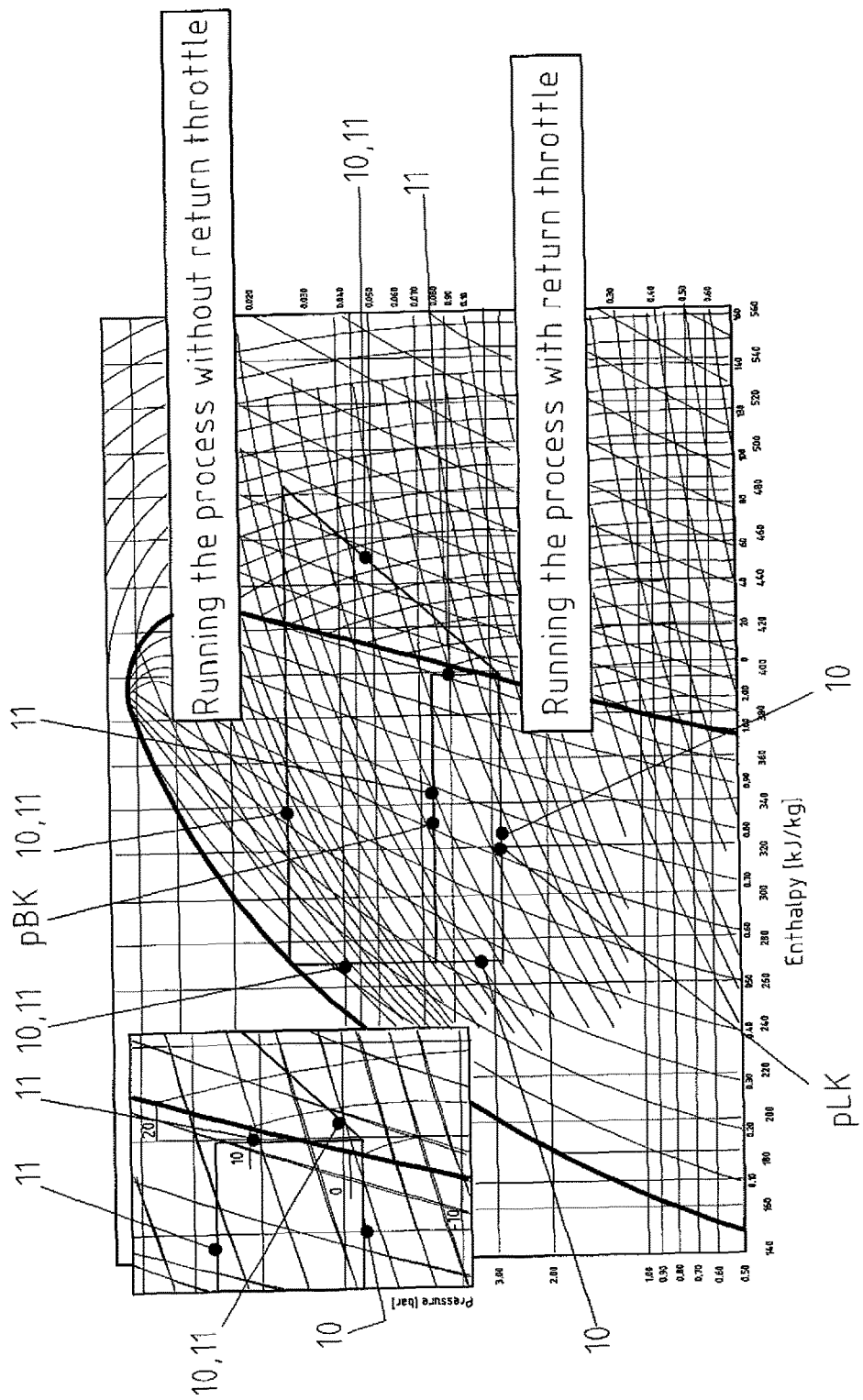
FIG. 3 is a log p, h-diagram of the refrigeration process of FIG. 1.

FIG. 3 shows a log p, h-diagram of a refrigeration process according to the refrigeration plant shown in FIG. 1, wherein the two refrigerant partial mass flows run at different evaporation pressure levels in the diphase region of the refrigerant. The process of the refrigerant circuit for the air cooler is denoted as 10. The process of the battery cooling is indicated as 11. The compression and the condensation for the air cooling and the battery cooling occurs as common refrigerant partial mass flow. In the upper left corner of the process, after the condensation, the refrigerant mass flow is divided and the refrigerant mass flow for the air cooling is reduced to the evaporation pressure $p_{LK}$. The evaporation of this refrigerant partial mass flow for the air cooling is executed up to a slight overheating.

The throttling of the refrigerant partial mass flow for the battery cooling occurs after condensation of the battery cooling down to the evaporation level $p_{BK}$, which is over the pressure level for the air cooling, $p_{LK}$, and is represented as mean horizontal denoted 11.

At the end of the diphase region after the evaporation, the second throttling out of the diphase region up to a slight overheating occurs and the assembling of the refrigerant partial mass flows is executed in the lower right corner of the refrigeration process prior to common compression.

The second throttling of the refrigerant partial mass flow for the battery cooling is shown on the left side of the diagram as a sectional enlargement.

Figure 4:
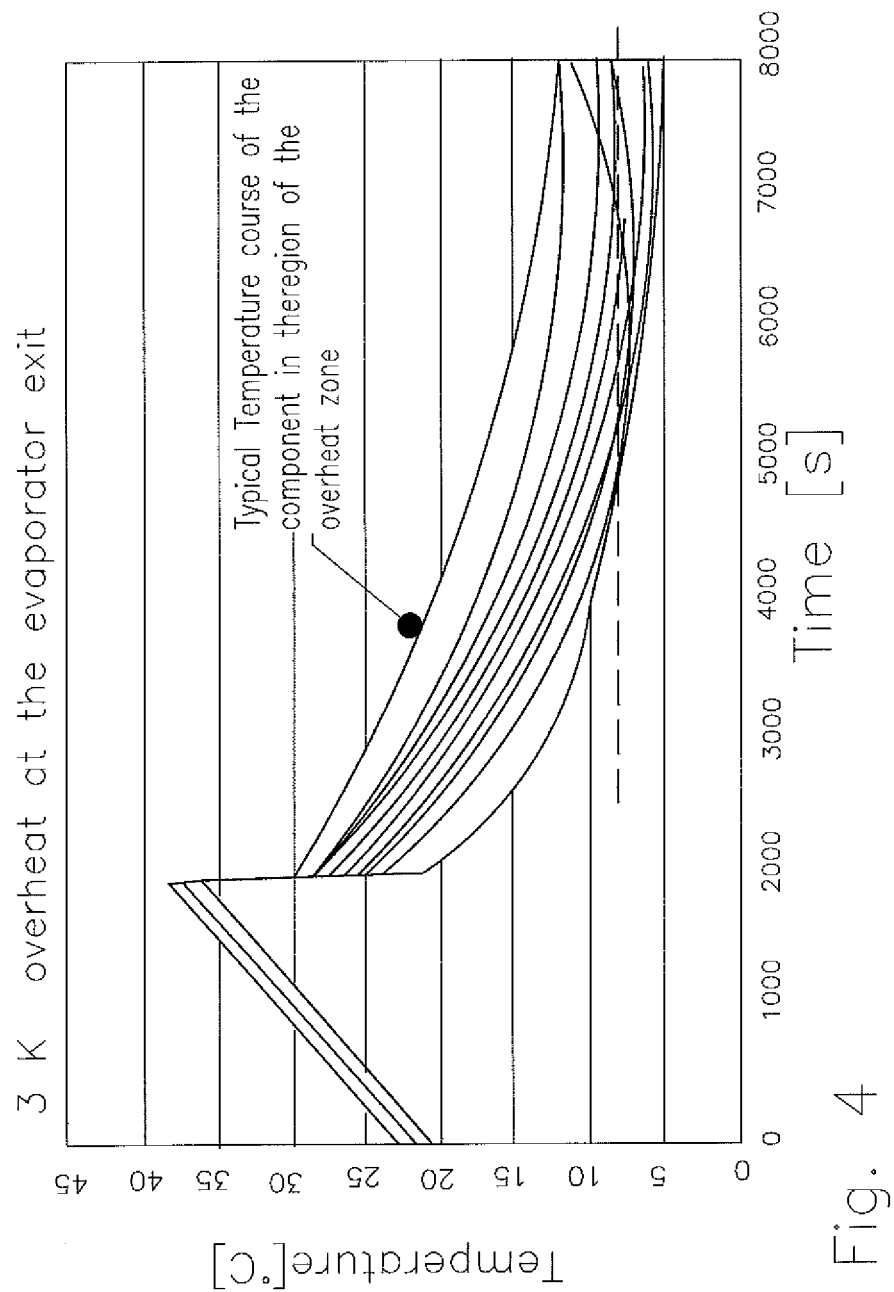
FIG. 4: a time-temperature diagram of a refrigeration plant as described in prior art.

In FIG. 4, a time-temperature diagram of the surface temperature of the battery contact cooler of a refrigeration plant according to the prior art is shown. The relatively high temperature spread is very clearly seen by the various curves of the individual measurement points at different levels that run apart from each other in a vertical direction. The resulting evaporation temperature level is about 8° C., which is relatively low for an optimal battery cooling.

Figure 5:
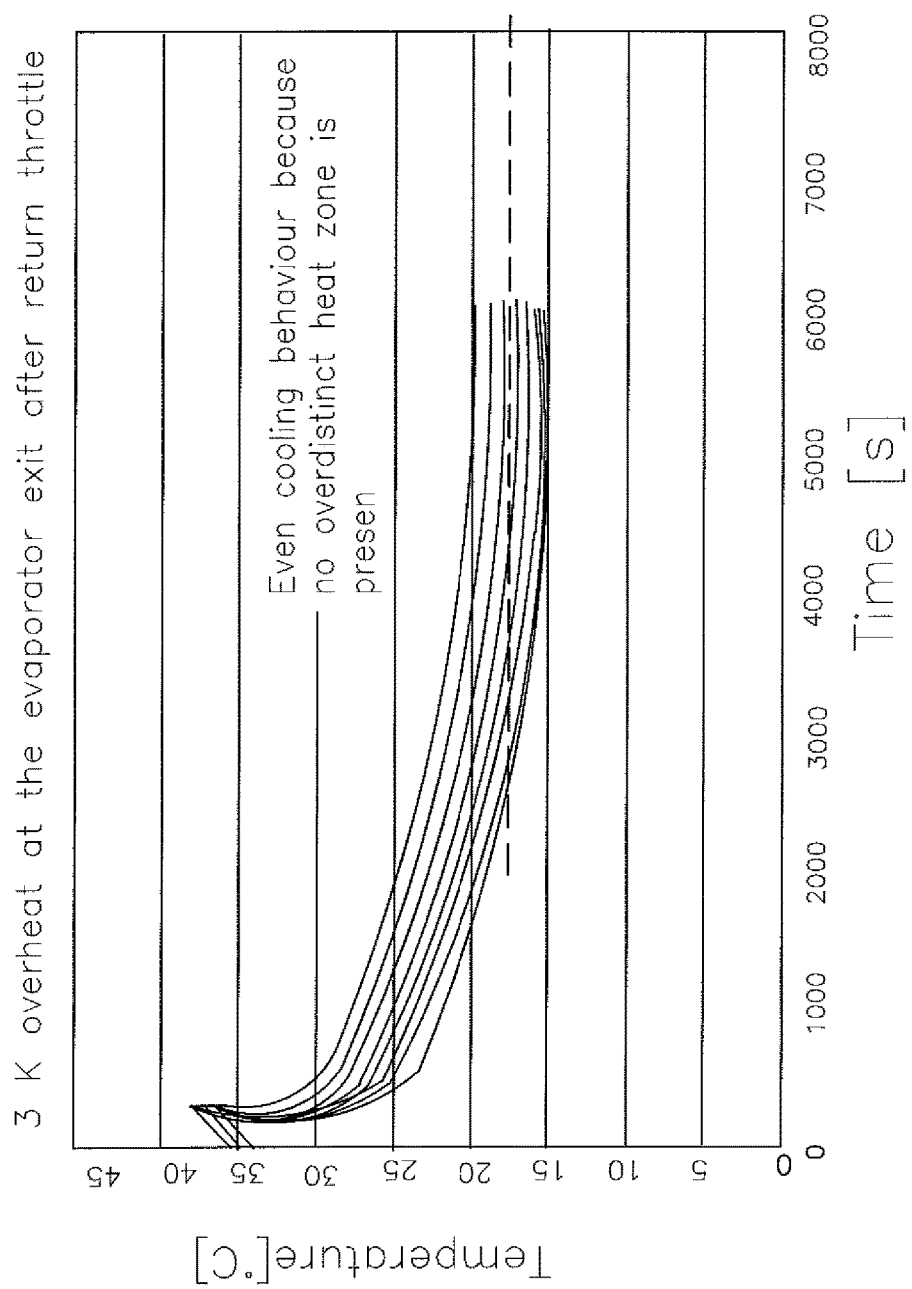
FIG. 5: a time-temperature diagram of a refrigeration plant of FIG. 1.

In contrast, FIG. 5 shows a time-temperature diagram of the surface temperature of the battery contact cooler of a refrigeration plant, with a smaller spread of the individual temperature measurement points in the vertical direction and the evaporation temperature increased to about 17° C.

In the evaporation processes according to FIG. 4, measurements were made with an overheat of 3 K at the evaporator exit, according to FIG. 5 after the throttling member, also referred to as return throttle.

Figure 6:
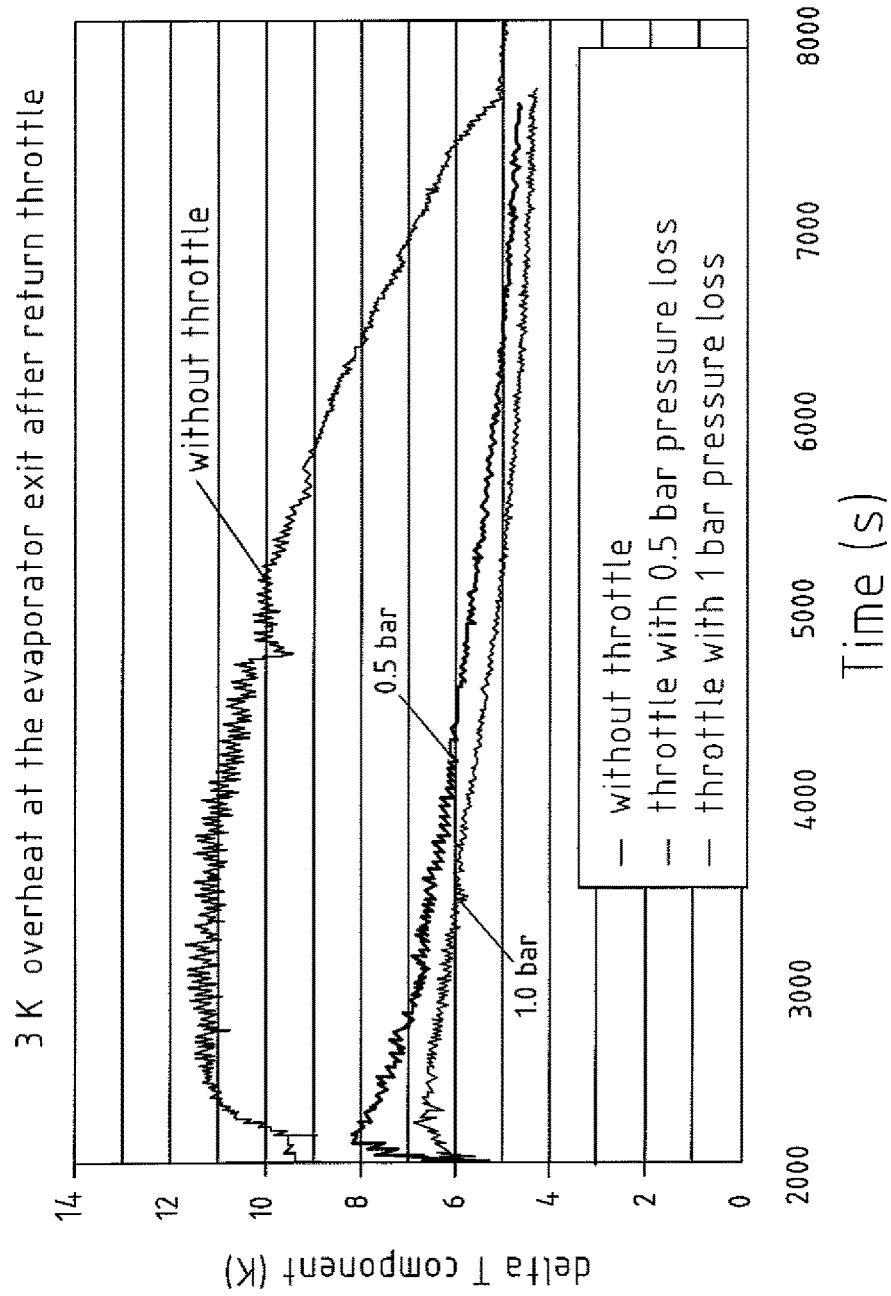
FIG. 6: a diagram of the temperature difference at the battery cooler over the time at different pressure losses according to an embodiment of the invention.

FIG. 6 shows a diagram of the temperature difference at the battery cooler over time for different pressure losses at the return throttle 5 according to FIG. 1. It is shown that absent throttling there is a very big temperature difference, and that high throttling results in a minimal temperature difference.

From the foregoing description, one ordinarily skilled in the art can easily ascertain the essential characteristics of this invention and, without departing from the spirit and scope thereof, can make various changes and modifications to the invention to adapt it to various usages and conditions.

NOMENCLATURE 1 evaporator, air cooler, passenger compartment evaporator
2 expansion member, thermostatic expansion valve
3 evaporator, battery cooler, contact cooler, battery contact cooler, refrigerant evaporator arrangement
4 expansion member, thermostatic expansion valve
5 throttling member, fixed throttle, return throttle
6 refrigerant compressor
7 condenser
8 tap of the expansion member
9 cooling tube
10 refrigeration process air cooling
11 refrigeration process battery cooling

The invention claimed is:

1. A refrigeration plant having a refrigerant evaporator arrangement for parallel air and battery contact cooling comprising:

a refrigerant compressor;

a condenser in fluid communication with the refrigerant compressor;

a first expansion member disposed between the condenser and a first evaporator for air cooling;

a single second expansion member disposed between the condenser and a second evaporator for battery cooling, wherein the second evaporator includes a plurality of single evaporators arranged in parallel; and a fixed throttling member disposed between the single second evaporator and a tap of the second expansion member, the fixed throttling member having a cross-sectional area, wherein the cross-sectional area through the fixed throttling member is constant over an instantaneous period of time to effect a pressure loss occurring as a refrigerant flows through the second evaporator;

wherein a first portion of the refrigerant flows through the first expansion member and a second portion of the refrigerant flows through the second expansion member, wherein the second portion of the refrigerant flows from the second expansion member to the second evaporator and from the second evaporator to the fixed throttling member, wherein the second portion of the refrigerant flows through each of the plurality of single evaporators of the second evaporator to the fixed throttling member effecting an approximately homogenous temperature distribution across a surface of the second evaporator, and wherein at least the second portion of the refrigerant flowing from the second evaporator to the fixed throttling member is in a diphase state.

2. The refrigeration plant according to claim 1, wherein a liquid separator is disposed upstream from the second evaporator.

3. The refrigeration plant according to claim 2, wherein the liquid separator is a centrifugal separator.

4. The refrigeration plant according to claim 1, wherein the first portion of the refrigerant, after flowing through the first expansion member, has an evaporation pressure lower than the second portion of the refrigerant after flowing through the second expansion member.

5. The refrigeration plant according to claim 4, wherein the second portion of the refrigerant, after flowing through the second expansion member, has the evaporation pressure higher than the first portion of the refrigerant after flowing through the first expansion member.

6. The refrigeration plant according to claim 5, wherein the evaporation pressure of the second portion of the refrigerant after flowing through the second evaporator and the fixed throttling member is equal to the evaporation pressure of the first portion of the refrigerant after flowing through the first evaporator.

7. The refrigeration plant according to claim 1, wherein the second portion of the refrigerant flow has the pressure loss of 1.0 to 2.0 bars while flowing through the second evaporator and the fixed throttling member.

8. The refrigeration plant according to claim 7, wherein the pressure loss of 0.5 bars occurs as the second portion of the refrigerant flows through the fixed throttling member.

9. The refrigeration plant according to claim 1, wherein the second evaporator contacts and is in heat exchange relationship with a battery.

10. The refrigeration plant according to claim 9, wherein the second portion of the refrigerant is impounded in the second evaporator, resulting in a homogeneous distribution of the second portion of the refrigerant in the second evaporator.

11. The refrigeration plant according to claim 10, wherein a throttling of the second portion of the refrigerant downstream of the second evaporator causes the impounding of the second portion of the refrigerant in the second evaporator.

12. A refrigeration plant having a refrigerant evaporator arrangement for parallel air and battery contact cooling comprising:

a refrigerant compressor;

a condenser in fluid communication with the refrigerant compressor;

a first expansion member disposed between the condenser and a first evaporator for air cooling;

a second expansion member disposed between the condenser and a second evaporator for battery cooling, wherein the second evaporator includes a plurality of single evaporators arranged in parallel; and a fixed throttling member disposed between the second evaporator and a tap of the second expansion member, the fixed throttling member having a cross-sectional area, wherein the cross-sectional area through the fixed throttling member is constant over an instantaneous period of time to effect pressure loss occurring as a refrigerant flows through the second evaporator;

wherein a first portion of the refrigerant flows through the first expansion member and a second portion of the refrigerant flows through the second expansion member, wherein the second portion of the refrigerant flows from the second expansion member to the plurality of single evaporators and from the plurality of single evaporators to the fixed throttling member, wherein the second portion of the refrigerant flows through each of the plurality of single evaporators of the second evaporator to the fixed throttling member effecting an approximately homogenous temperature distribution across a surface of the second evaporator, and wherein at least the second portion of the refrigerant flowing from the plurality of single evaporators to the fixed throttling member is in a diphase state;

wherein the first portion of the refrigerant, after flowing through the first expansion member, has an evaporation pressure lower than the second portion of the refrigerant after flowing through the second expansion member, wherein the second portion of the refrigerant, after flowing through the second expansion member, has the evaporation pressure higher than the first portion of the refrigerant after flowing through the first expansion member, and wherein the second portion of the refrigerant, after flowing through the second evaporator and the throttling member, has the same evaporation pressure as the first portion of the refrigerant after flowing through the first evaporator.

13. The refrigeration plant according to claim 12, wherein a liquid separator is disposed upstream from the second evaporator.

* * * * *